Aug. 30, 1949.　　　L. W. WACHTER　　　2,480,528
ELEVATING PLATFORM LATCH STRUCTURE
Filed June 6, 1947　　　　　　　　　　　　2 Sheets-Sheet 1
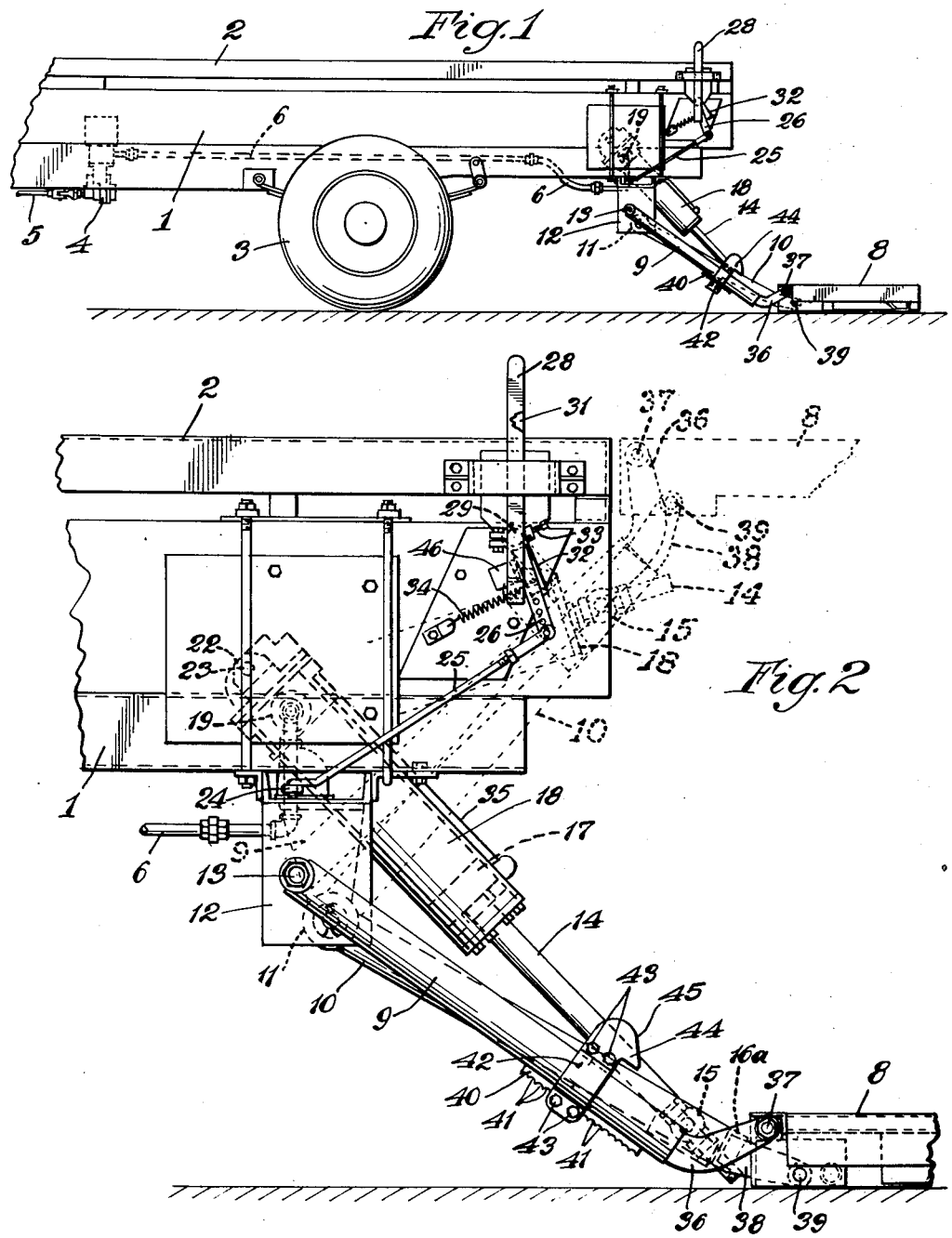
Inventor
Lester W. Wachter
by Parker + Carter
Attorneys.

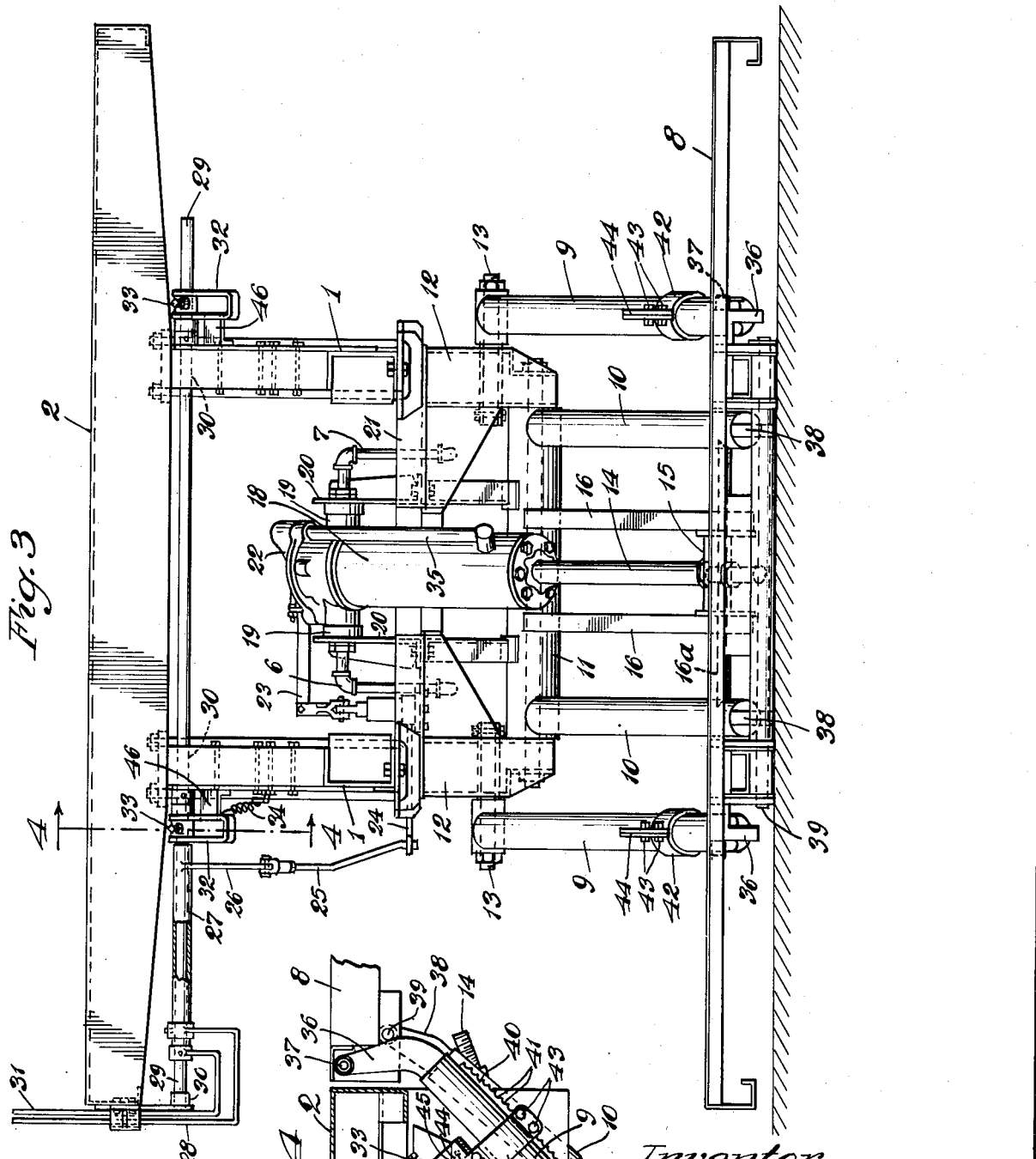

Patented Aug. 30, 1949

2,480,528

UNITED STATES PATENT OFFICE 2,480,528

ELEVATING PLATFORM LATCH STRUCTURE

Lester W. Wachter, Streator, Ill., assignor to Anthony Company, Streator, Ill., a corporation of Illinois Application June 6, 1947, Serial No. 752,955

8 Claims. (Cl. 214—77)

This invention relates to an elevating platform or member associated with a support. In the particular form here shown it is an elevating platform or tailgate positioned on an automotive vehicle. One object is to provide means for holding the gate or platform in a raised position without the application of power.

Another object is to provide automatic means for latching the platform in raised position when movement of the platform is not required.

Other objects will appear from time to time in the specification and claims.

The invention is illustrated more or less diagrammatically in the accompanying drawings, wherein:

Figure 1 is a side elevation of the platform mounted on a motor truck, the platform being in the lowered position;

Figure 2 is a fragmentary side elevation of the platform, showing it in full lines in lowered position, and in dotted lines in raised position;

Figure 3 is a rear elevation of the platform;

Figure 4 is a fragmentary section taken at the line 4—4 of Figure 3.

Like parts are indicated by like characters in the specification and drawings.

I represents a motor truck or automotive vehicle having a load-carrying surface member 2. Wheels 3 support the truck. 4 is a pump driven by a shaft 5 from an engine, for example the engine of the vehicle. Pressure fluid passes from the pump 4 through conduits 6 and returns through a conduit 7. The particular details of the truck and the pump system form no essential part of the present invention, and only so much will be described as is necessary for an understanding of the other device which forms the subject matter of the invention.

A platform or tailgate 8 is movably supported on two pairs of arms 9 and 10. As shown in Figure 3, the arms 10 are positioned inside the arms 9. The arms 10 are carried on a member 11 which is pivotally supported on extensions 12 which are themselves fastened to or supported from the frame of the truck 1. The arms 9 are pivoted as at 13 on the extensions 12 outside of, forwardly and somewhat above the pivot points of the member 11. A piston rod 14 of a piston and cylinder assembly is provided with a crosshead 15 which is pivoted in the members 16 secured to the member 11 and a cross member 16a associated with the arms 10. The piston rod 14 is secured to a piston 17 which is mounted for reciprocation within a cylinder 18. The cylinder is pivoted, as at 19, on members 20 which are themselves fixed to a cross member 21 secured to any convenient part of the truck 1. The conduits 6 and 7 are, as shown in Figure 3, concentric with the pivot point of the cylinder 18, and fluid may be conducted to and from the cylinder through these conduits. A valve for controlling the flow of fluid is enclosed in the housing 22. A valve operating member 23 extends outwardly from the housing 22. The valve-operating means includes also a member 24 and a link 25 secured to an arm 26. This arm is fixed to a tube 27 which may be rotated by a handle 28. The tube 27 is positioned about a rod or shaft 29 which is supported in bearings as at 30 mounted on the truck. A handle 31 is provided for rotating the rod 29. A pair of latch members 32 is adjustably fixed on the rod 29 by set screws 33. One or more springs 34 may be engaged with one or more of the latches 32 and urge them in a counterclockwise direction.

A conduit 35 on the cylinder 18 may direct pressure fluid to the outer end of the cylinder. Through this conduit pressure is directed to cause the piston to be withdrawn in the cylinder and to raise the platform 8.

The details of the platform structure form no essential part of the present invention. It is preferable, however, to connect the arms 9 and 10 to the platform 8 in the manner shown. Thus the arms 9 are provided with curved portions 36 which are pivoted to the platform as at 37. The arms 10 are provided with portions 38 which are pivoted to the platform as at 39. As shown particularly in Figure 2, the points 39 are below and forwardly of the points 37.

One or both of the arms 9 may be provided with a hook-engaging member 40. As shown, this member is provided with notches or serrations 41. Movably positioned about the members 9 are collars 42 which may be formed in any desired manner. As shown they are formed of two parts bolted together as at 43. The lowermost bolts 43 may fit into the serrations 41, and the collars 42 are thus adjustable along the members 9 and are secured in adjusted position by tightening the bolts 43. Each of the collars is provided with an upwardly directed hook member 44 which is provided on its upper surface with an inclined or cam face 45.

As illustrated in full lines in Figures 2 and 3, the members 46 comprise stops against which the latches 32 are held when the platform or tailgate is not latched in the raised position.

Although I have shown an operative form of my invention, it will be recognized that many changes in the form, shape and arrangement of parts can be made without departing from the spirit of the invention, and my showing is therefore to be taken as, in a sense, diagrammatic.

The use and operation of this invention are as follows:

In the form shown the platform is mounted on the rear of a motor truck or other automotive vehicle. It is used to raise and lower a load to or from surface member 2.

Assuming that the platform is in the position shown in Figures 1, 2 and 3, and that it is desired to raise a load, the operation is as follows: The load is put on the platform while it is below the surface of the member 2. Pressure fluid is now supplied to the cylinder and is directed, by means of the valve or otherwise, through the pipe 35 to the outer end of the cylinder, and thus pressure is supplied below the piston 17 to force it inwardly. As it moves inwardly, the piston rod 14 is correspondingly drawn in and the platform is raised. Usually the platform will be raised until its upper surface is on a level with the upper surface member 2. The load may then be transferred from the platform to the truck.

With the platform at the same level as the surface member 2, if no further use is to be made of the platform for raising or lowering, it is convenient to provide means for holding the platform in raised position without the continued use of pressure within the cylinder. The latch and hook construction above described is provided for this purpose.

As the platform is raised toward the dotted line position of Figure 2, the hooks 44 come in contact with the latches 32. The inclined or cam face 45 of each hook contacts a latch member 32, and as the arms 9 are raised, the inclined faces 45 force the latches outwardly against the springs 34. When the hooks have been moved upwardly sufficiently to clear the latches 32, the spring 34 carries the latches under the hooks into the position shown in Figure 4. With the parts in this position the latch and hook mechanism will hold the platform up without the assistance of the piston and cylinder assembly. In this position, therefore, no pressure is necessary, and the pump may be stopped. The platform will usually be held in this raised position during travel, and it may be held in this position by the latch and hook assemblies at all times when the platform is not being raised or lowered.

With the parts latched in the position of Figure 4, in which the platform is held in the upper position, if it is desired to free the platform for lowering movement, the following operation takes place: The handle 31 is moved counterclockwise from the position of Figures 1 and 2. This rotates the shaft 29 counterclockwise and rotates the latches 32 counterclockwise. This movement is yieldingly resisted by the spring 34. When the unlatching movement of the latches has been carried out sufficiently, they have been moved out of engagement with the hooks 44, and the platform may then be allowed to descend. The descending movement of the platform is ordinarily accomplished by gravity alone, and it is sufficient to permit pressure fluid to escape from the cylinder. The weight of the parts then moves the platform and the piston and cylinder assembly from the dotted line position of Figure 2 to the full line position of that figure.

The construction shown herewith and described above thus provides an automatic means for latching the platform in raised position, and for holding it in that position without reliance upon the raising mechanism. It is recognized that if pressure is maintained in the raising mechanism, the platform may be held in the raised position by the pressure. This is, however, wasteful, and there is always the danger that the pressure mechanism may be accidentally released or may otherwise operate to cause or permit lowering of the platform. The latching means, therefore, automatically holds the platform in the raised position without reliance upon the hoisting mechanism.

I claim:

1. In combination a support and a member mounted for movement with respect thereto, and means for moving said member, a control assembly for said raising means and means independent of said moving means for releasably securing said member in position, said means including latches movably mounted on said support, and means for moving them and latch-engaging means mounted to move with said member, spring means biased to move said latching means in one direction, said members mounted to interfit with said latches, said control assembly and said means for moving said latch engaging members being mounted closely adjacent to each other.

2. In combination a support and a member mounted for movement up and down with respect thereto, and pressure fluid means for moving said member up and down, a control assembly for said moving means and means independent of said pressure moving means for releasably securing said member in the raised position, said securing means including latches movably mounted on said support, and latch-engaging means mounted to move with said member and means for moving them, spring means biased to move said latching means in one direction, said members mounted to penetrate said latches, said control assembly including parts mounted for movement concentric with the means for moving said latch engaging members.

3. In combination a support and a load-carrying member movably mounted thereon, arms joined to said support and to said load-carrying member, and means mounted on said support and engaging said load-carrying member and adapted to raise said member, and a control assembly for said raising means, latches movably mounted on said support and means for moving them, spring means biased to hold them in one position, and latch-engaging means on said arms, said latch-engaging means adapted, as said load-carrying member is raised, to contact said latches and to move them into engagement with said latch-engaging means, a part of said control assembly being mounted concentrically with said latch moving means.

4. In combination a support and a load-carrying member movably mounted thereon, arms joined to said support and to said load-carrying member, and means mounted on said support and engaging said load-carrying member and adapted to raise said member, and a control assembly for said raising means, latches movably mounted on said support and means for moving said latches, spring means biased to hold them in one position, and latch-engaging means on said arms, said latch-engaging means provided with inclined surfaces and adapted, as said load-carrying member is raised, to contact said latches and to move them into engagement with said latch-engaging means, said control assembly comprising a part mounted concentrically with said latch moving means.

5. In combination a support and a load-carrying member movably mounted thereon, pivoted arms joined to said support and to said load-carrying member, and means mounted on said support and engaging said load-carrying member and adapted to raise said member, and a control assembly for said raising means, latches movably mounted on said support and means for moving them, spring means biased to hold them in one position, and latch-engaging means on said arms, said latch-engaging means provided with inclined surfaces and adapted, as said load-carrying member is raised, to contact said latches and to move them into engagement with said latch-engaging means, said control assembly comprising a part mounted concentrically with said latch moving means.

6. In combination a vehicle and a movable platform supported therefrom and means for raising and lowering said platform, arms engaging said vehicle and said platform, hooks mounted on said arms, latches movably mounted on said vehicle, means for moving said latches, said hooks adapted and positioned, as said platform is raised, to contact and engage said latches, and spring means effective on said latches and biased to hold them in engagement with said hooks, said latch moving means including a shaft and a control assembly for said raising and lowering means, including a sleeve mounted about said shaft.

7. In combination a vehicle and a movable platform supported therefrom by means of members pivoted with respect to the vehicle, and means for raising and lowering said platform, and a control assembly for controlling said raising and lowering means, said assembly including a part mounted for rotation and a handle for rotating said part, and a two-part latch assembly including a hook and a movably mounted latch, one being mounted upon said pivoted members and the other being mounted upon said vehicle, and means for moving said hook, said means including a part mounted concentrically with said control assembly and a handle for rotating it, said two handles being located closely adjacent each other.

8. In combination a vehicle and a platform movably supported therefrom, members pivoted on said vehicle and secured to said platform and means for raising and lowering said platform, and a latch means including hooks fixed on said pivoted members and latches movably supported from said vehicle, means for moving said latches comprising a shaft pivoted upon said vehicle and a handle for rotating said shaft, and means for controlling said raising and lowering means including a sleeve positioned about said shaft for movement concentric with respect thereto, and a handle for rotating said sleeve, said two handles being positioned closely and adjacent each other.

LESTER W. WACHTER.

REFERENCES CITED

The following references are of record in the file of this patent:

UNITED STATES PATENTS

| Number | Name | Date |
| --- | --- | --- |
| 2,110,239 | Richter | Mar. 8, 1938 |
| 2,370,334 | Wachter | Feb. 27, 1945 |
| 2,389,221 | Wachter | Nov. 20, 1945 |